US012683159B2

(12) United States Patent (10) Patent No.: US 12,683,159 B2
Nagamine et al. (45) **Date of Patent: \*Jul. 14, 2026**

(54) POSITIVE ELECTRODE MATERIAL AND BATTERY

(71) Applicant: Panasonic Intellectual Property Management Co., Ltd., Osaka (JP)

(72) Inventors: Kenta Nagamine, Osaka (JP); Izuru Sasaki, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 473 days.

This patent is subject to a terminal disclaimer.

(21) Appl. No.: 18/153,364

(22) Filed: Jan. 12, 2023

(65) Prior Publication Data

US 2023/0163299 A1     May 25, 2023

Related U.S. Application Data

(63) Continuation of application No. PCT/JP2021/025293, filed on Jul. 5, 2021.

(30) Foreign Application Priority Data

Jul. 22, 2020    (JP) ................................ 2020-125307
Dec. 28, 2020    (JP) ................................ 2020-219574

(51) Int. Cl.
H01M 4/58          (2010.01)
H01M 4/36          (2006.01)
(Continued)

(52) U.S. Cl.
CPC ........... H01M 4/582 (2013.01); H01M 4/366 (2013.01); H01M 2004/028 (2013.01);
(Continued)

(58) Field of Classification Search
CPC ................. H01M 4/582; H01M 4/525; H01M 2300/0068; H01M 2300/008; H01M 2300/0065
See application file for complete search history.

(56) References Cited

U.S. PATENT DOCUMENTS 10,547,055 B2     1/2020  Matsuda
11,404,718 B2     8/2022  Sakai et al.
(Continued)

FOREIGN PATENT DOCUMENTS

CN          109873207 A       6/2019
CN          111201643 A       5/2020
(Continued)

OTHER PUBLICATIONS

The EPC Office Action dated Jul. 3, 2024 for the related European Patent Application No. 21845968.3.
(Continued)

*Primary Examiner* — Maria Laios
*Assistant Examiner* — Ziheng Lu
(74) *Attorney, Agent, or Firm* — WHDA, LLP

(57)          ABSTRACT

A positive electrode material includes a positive electrode active material, a first solid electrolyte, and a coating material covering at least part of the surface of the positive electrode active material. The first solid electrolyte is represented by the following compositional formula (1): $Li_aM_bX_c$ . . . Formula (1). In the compositional formula (1), a, b and c are each independently a positive real number, M includes calcium, yttrium, and at least one rare earth element other than yttrium, and X includes at least one selected from the group consisting of F, Cl, Br and I.

20 Claims, 2 Drawing Sheets

(51) Int. Cl.
   *H01M 4/02*       (2006.01)
   *H01M 10/0525*    (2010.01)

(52) U.S. Cl.
   CPC ................ *H01M 10/0525* (2013.01); *H01M 2300/0068* (2013.01); *H01M 2300/008* (2013.01)

(56) References Cited

U.S. PATENT DOCUMENTS

| | | |
|---|---|---|
| 11,524,902 B2 | 12/2022 | Asano et al. |
| 11,605,833 B2 | 3/2023 | Isojima et al. |
| 11,637,315 B2 | 4/2023 | Ouspenski et al. |
| 11,848,414 B2 | 12/2023 | Assat et al. |
| 12,132,171 B2 | 10/2024 | Isohima et al. |
| 12,288,844 B2* | 4/2025 | Kubo ...................... C01F 17/36 |
| 12,308,384 B2 | 5/2025 | Assat et al. |
| 12,451,513 B2* | 10/2025 | Nishio .............. H01M 10/0562 |
| 12,525,642 B2 | 1/2026 | Nakama et al. |
| 2009/0081554 A1 | 3/2009 | Takada et al. |
| 2011/0027551 A1 | 2/2011 | Huang et al. |
| 2011/0027661 A1 | 2/2011 | Okazaki et al. |
| 2011/0057151 A1 | 3/2011 | Chen et al. |
| 2014/0087270 A1 | 3/2014 | Yoshida |
| 2016/0268661 A1 | 9/2016 | Kim et al. |
| 2018/0090752 A1* | 3/2018 | Fujiki ................... H01M 4/364 |
| 2019/0088949 A1 | 3/2019 | Makino et al. |
| 2019/0088995 A1 | 3/2019 | Asano et al. |
| 2019/0386322 A1 | 12/2019 | Yawata et al. |
| 2020/0119362 A1 | 4/2020 | Furusawa et al. |
| 2020/0127325 A1 | 4/2020 | Takahashi et al. |
| 2020/0144575 A1 | 5/2020 | Ku et al. |
| 2020/0184253 A1 | 6/2020 | Butscher et al. |
| 2020/0328453 A1 | 10/2020 | Sakai et al. |
| 2020/0328459 A1 | 10/2020 | Sakai et al. |
| 2020/0328460 A1 | 10/2020 | Asano et al. |
| 2020/0343554 A1 | 10/2020 | Oshima et al. |
| 2020/0350615 A1 | 11/2020 | Sakaida et al. |
| 2020/0350626 A1 | 11/2020 | Matsumura et al. |
| 2021/0218054 A1 | 7/2021 | Oshima et al. |
| 2021/0273259 A1 | 9/2021 | Nagamine et al. |
| 2021/0328262 A1* | 10/2021 | Nishio .............. H01M 10/0525 |
| 2021/0376377 A1 | 12/2021 | Tanaka et al. |
| 2022/0209291 A1 | 6/2022 | Kubo et al. |
| 2022/0246983 A1 | 8/2022 | Suzuki et al. |
| 2022/0255125 A1 | 8/2022 | Suzuki et al. |
| 2022/0285721 A1 | 9/2022 | Miyatake et al. |
| 2022/0294008 A1 | 9/2022 | Kambara et al. |
| 2022/0294012 A1 | 9/2022 | Nishio et al. |
| 2022/0320571 A1 | 10/2022 | Hirano et al. |
| 2022/0367845 A1 | 11/2022 | Sasaki et al. |
| 2023/0163299 A1 | 5/2023 | Nagamine et al. |
| 2024/0194868 A1 | 6/2024 | Hayashi et al. |
| 2024/0413385 A1 | 12/2024 | Ueno et al. |
| 2026/0024806 A1 | 1/2026 | Nishio et al. |

FOREIGN PATENT DOCUMENTS

| | | |
|---|---|---|
| CN | 112771626 A | 5/2021 |
| EP | 3745504 B1 | 12/2018 |
| EP | 3467845 A1 | 4/2019 |
| EP | 4044291 A1 | 8/2022 |
| EP | 4084120 A1 | 11/2022 |
| EP | 4102594 A1 | 12/2022 |
| JP | 2016-139511 A | 8/2016 |
| WO | 2007/004590 | 1/2007 |
| WO | 2015/144074 A1 | 10/2015 |
| WO | 2018/025582 A1 | 2/2018 |
| WO | 2018/168505 A1 | 9/2018 |
| WO | 2019/135315 A1 | 7/2019 |
| WO | 2019/135319 A1 | 7/2019 |
| WO | 2019/135343 A1 | 7/2019 |
| WO | 2019/146218 A1 | 8/2019 |
| WO | 2019/146236 A1 | 8/2019 |
| WO | 2019/146308 A1 | 8/2019 |
| WO | 2020/100465 A1 | 5/2020 |
| WO | 2020/137026 A1 | 7/2020 |
| WO | 2020/137189 A1 | 7/2020 |
| WO | 2020/137391 A1 | 7/2020 |
| WO | 2021/070595 A1 | 4/2021 |
| WO | 2021/131716 A1 | 7/2021 |
| WO | 2021/157361 A1 | 8/2021 |

OTHER PUBLICATIONS

International Search Report of PCT application No. PCT/JP2021/025293 dated Aug. 24, 2021.

Atsushi Sakuda et al., "Interfacial Observation between LiCoO2 Electrode and Li2S-P2S5 Solid Electrolytes of All- Solid-State Lithium Secondary Batteries Using Transmission Electron Microscopy", Chemistry of Materials, American Chemical Society, 2010, vol. 22, No. 3, Sep. 25, 2009, pp. 949-956.

International Search Report issued on Mar. 9, 2021 in International Patent Application No. PCT/JP2020/045914, with English translation.

International Search Report of PCT application No. PCT/JP2021/025292 dated Aug. 31, 2021.

International Search Report of PCT application No. PCT/JP2022/027342 dated Sep. 27, 2022.

Extended European Search Report dated May 27, 2024 issued in the corresponding European Patent Application No. 20906558.0.

The EPC Office Action dated Jul. 3, 2024 for the related European Patent Application No. EP21846770.2.

The EPC Office Action dated Sep. 9, 2025 for the related European Patent Application No. 22864061.1.

Chinese Search Report dated Jun. 28, 2024 issued in the corresponding Chinese Patent Application No. 202080088589.9, with English translation.

Masahiro Tatsumisago et al., "All-solid-state lithium secondary batteries using sulfide-based glass-ceramic electrolytes", Journal of Power Sources 159 (2006), May 24, 2006, pp. 193-199.

A. Zevgolis et al., "Alloying Effects on Superionic Conductivity in Lithium Indium Halides for All-Solid-State Batteries", Applied Physics Letters Materials, Nov. 1, 2017, pp. 1-14.

Non-Final Office Action dated Feb. 6, 2025 issued in U.S. Appl. No. 17/842,546.

Non-Final Office Action dated Jul. 17, 2025 issued in U.S. Appl. No. 17/842,546.

Final Office Action dated Dec. 4, 2025 issued in U.S. Appl. No. 17/842,546.

Non-Final Office Action dated Jul. 23, 2025 issued in U.S. Appl. No. 18/153,354.

Non-Final Office Action dated Aug. 7, 2025 issued in U.S. Appl. No. 18/153,354.

Non-Final Office Action dated Nov. 26, 2025 issued in U.S. Appl. No. 18/153,354.

Non-Final Office Action dated Aug. 7, 2025 issued in U.S. Appl. No. 18/444,615.

Final Office Action dated Dec. 3, 2025 issued in U.S. Appl. No. 18/444,615.

Notice of Allowance dated Feb. 2, 2026 issued in related U.S. Appl. No. 17/842,546.

Notice of Allowance dated Feb. 11, 2026 issued in related U.S. Appl. No. 18/444,615.

Notice of Allowance dated Mar. 13, 2026 issued in U.S. Appl. No. 17/842,546.

Notice of Allowance dated Apr. 3, 2026 issued in U.S. Appl. No. 18/153,354.

Notice of Allowance dated Mar. 24, 2026 issued in U.S. Appl. No. 18/444,615.

Search Report for the corresponding Chinese Patent Application No. 202180061394.X, with English translation.

* cited by examiner

<u>1000</u>

110

100

111

<u>2000</u>

201

202

203

<u>1000</u>

110

100

111

POSITIVE ELECTRODE MATERIAL AND BATTERY

BACKGROUND

1. Technical Field

The present disclosure relates to a positive electrode material for battery, and to a battery.

2. Description of the Related Art

WO 2007/004590 (Patent Literature 1) discloses an all-solid-state lithium battery that includes a lithium ion conductive solid electrolyte based on a sulfide, and an active material covered with a lithium ion conductive oxide on the surface.

Am. Chem. Soc. 2010, Vol. 22, 3, 949-956 (Non Patent Literature 1) describes that a battery including a sulfide solid electrolyte comes to have an increased battery resistance after initial charging due to the formation of an interface layer at the interface between the positive electrode material and the sulfide solid electrolyte.

SUMMARY

One non-limiting and exemplary embodiment provides a positive electrode material that can reduce the resistance of a battery.

In one general aspect, the techniques disclosed here feature a positive electrode material including a positive electrode active material, a first solid electrolyte, and a coating material covering at least part of the surface of the positive electrode active material, wherein the first solid electrolyte is represented by the following compositional formula (1): $Li_aM_bX_c$ . . . Formula (1) wherein in the compositional formula (1), a, b and c are each independently a positive real number, M includes calcium, yttrium, and at least one rare earth element other than yttrium, and X includes at least one selected from the group consisting of F, Cl, Br and I.

The positive electrode material provided by the present disclosure can reduce the resistance of a battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figures 1, 2, 3:
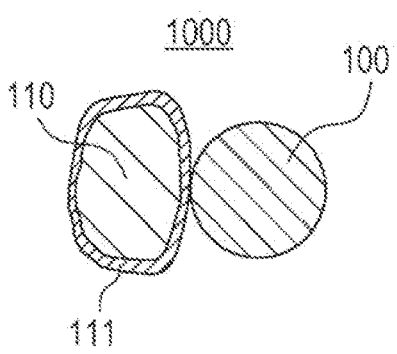
FIG. 1 is a sectional view illustrating a schematic configuration of a positive electrode material according to embodiment 1.
FIG. 2 is a sectional view illustrating a schematic configuration of a battery according to embodiment 2.
FIG. 3 is a view illustrating a Nyquist diagram of a battery of Example 1 at 3.7 V.

DETAILED DESCRIPTIONS (Underlying Knowledge Forming Basis of the Present Disclosure)

Patent Literature 1 discloses an all-solid-state lithium battery that includes a lithium ion conductive solid electrolyte based on a sulfide, and an active material covered with a lithium ion conductive oxide on the surface. Patent Literature 1 describes that the lithium ion conductive oxide, especially lithium niobate (namely, $LiNbO_3$) eliminates or reduces the formation of a high-resistance layer between the sulfide solid electrolyte and the surface of the positive electrode active material, and consequently output characteristics are markedly enhanced.

Non Patent Literature 1 describes that a high-resistance layer is formed between the sulfide solid electrolyte and the surface of the positive electrode active material due to the mutual diffusion of the metal elements contained in the positive electrode active material and the elements constituting the solid electrolyte. Some elements that are mentioned as solid electrolyte constituents are P and S. That is, the formation of a high-resistance layer described above stems from the presence of P or S constituting the solid electrolyte.

According to the findings obtained from the inventions described in Patent Literature 1 and Non Patent Literature 1, a battery including a sulfide as a solid electrolyte should be designed so that the surface of an active material is covered with a coating material such as, for example, a lithium ion conductive oxide to sufficiently prevent the solid electrolyte from contact with the active material; otherwise, the resistance at the interface between the active material and the solid electrolyte becomes so high and the polarization is so increased that the battery ends up being substantially inoperable. Meanwhile, a battery including a S-free solid electrolyte is operable even in the absence of a lithium ion conductive oxide covering the surface of an active material.

However, extensive studies by the present inventors have found that covering the surface of an active material in a positive electrode material with a coating material reduces the battery resistance even when a first solid electrolyte contained in the positive electrode material is free from P and S. The reasons behind this are not clear but are probably mixed contributions of various factors such as the withstand voltage of the coating material, the oxidation resistance of a lithium ion conductive solid electrolyte used as the solid electrolyte in a battery, the reactivity between the coating material and the active material, the reactivity between the coating material and the solid electrolyte, and physical contact between the active material and the solid electrolyte.

When, for example, the lithium ion conductive solid electrolyte used as the solid electrolyte in a battery is a halide, the increase in positive electrode potential during charging of the battery induces the oxidation of the halogen contained in the solid electrolyte. Such oxidation of the halogen leads to the decomposition of the solid electrolyte. Furthermore, the halogen oxidation reaction generates a halogen gas, which creates gaps at the contact interface between the active material and the solid electrolyte to cause a decrease in effective reaction area. Consequently, the battery resistance is increased. By separating the active material and the solid electrolyte from each other through a coating material that covers the surface of the active material, the solid electrolyte is prevented from contact with the active material at a high potential, and consequently the oxidation of halogen will be eliminated or reduced. These are probably the reasons why the battery resistance can be reduced.

Halide solid electrolytes are crystals with high ionic bonding properties. Therefore, a solid electrolyte that contains a rare earth element having a relatively large ionic radius, in particular, Sc, and/or a lanthanoid element, has a large bond distance between the cation, namely, Sc and/or the lanthanoid element, and the anion, namely, the halogen. A large bond distance means that the bond between the cation and the anion is weak, that is, the halogen anion is easily released. The coating on the active material eliminates or reduces the oxidation of the halogen in the solid electrolyte and is thus more effective for reducing the battery resistance.

Based on the above findings, the present inventors have reached a positive electrode material of the present disclosure described below that can reduce the resistance of a battery.

(Summary of Aspects of the Present Disclosure)

A positive electrode material according to the first aspect of the present disclosure includes:

a positive electrode active material;

a first solid electrolyte; and a coating material covering at least part of the surface of the positive electrode active material, wherein the first solid electrolyte is represented by the following compositional formula (1):

$$Li_aMbX_c \hspace{3cm} \text{Formula (1)}$$

wherein in the compositional formula (1), a, b and c are each independently a positive real number, M includes calcium, yttrium, and at least one rare earth element other than yttrium, and X includes at least one selected from the group consisting of F, Cl, Br and I.

In the positive electrode material according to the first aspect, the coating material is interposed between the positive electrode active material and the first solid electrolyte that is a halide solid electrolyte. This coating material inhibits the transfer of electrons to and from the halide solid electrolyte even when the potential of the positive electrode is elevated during charging of a battery. That is, the halogen in the halide solid electrolyte is prevented from oxidation reaction, and consequently the decomposition of the first solid electrolyte as well as the generation of halogen gas are eliminated or reduced. As a result, the first solid electrolyte is prevented from degradation, and no or a small decrease is attained in the effective reaction area between the positive electrode active material and the first solid electrolyte. For these reasons, the positive electrode material according to the first aspect can reduce the resistance of a battery. Furthermore, the ion conductivity of the first solid electrolyte can be further enhanced. Thus, the charge/discharge efficiency of a battery can be further enhanced.

In the second aspect of the present disclosure, for example, the positive electrode material according to the first aspect may be such that the coating material includes O.

The positive electrode material according to the second aspect can reduce the resistance of a battery more effectively.

In the third aspect of the present disclosure, for example, the positive electrode material according to the first or second aspect may be such that the coating material includes Li.

The positive electrode material according to the third aspect can attain a high carrier concentration, namely, a high Li concentration at the interface between the positive electrode active material and the first solid electrolyte. Thus, the positive electrode material according to the third aspect can reduce the resistance of a battery more effectively.

In the fourth aspect of the present disclosure, for example, the positive electrode material according to any one of the first to the third aspect may be such that the coating material includes at least one selected from the group consisting of lithium phosphate and lithium niobate.

Lithium phosphate and lithium niobate can increase the lithium ion conductivity of the coating material. Thus, the positive electrode material according to the fourth aspect can reduce the resistance of a battery more effectively.

In the fifth aspect of the present disclosure, for example, the positive electrode material according to any one of the first to the fourth aspect may be such that the mass ratio of the coating material to the positive electrode active material is greater than or equal to 0.5 mass % and less than or equal to 2.0 mass %.

When the amount of coating is controlled to the above range, lithium ions are smoothly transferred between the active material and the solid electrolyte, and thus the resistance of a battery can be reduced more effectively.

In the sixth aspect of the present disclosure, for example, the positive electrode material according to any one of the first to the fifth aspect may be such that the thickness of the coating material is greater than or equal to 2 nm and less than or equal to 20 nm.

When the thickness of the coating material is controlled to the above range, the energy density of a battery can be enhanced. Furthermore, the resistance of a battery can be reduced more effectively.

In the seventh aspect of the present disclosure, for example, the positive electrode material according to any one of the first to the sixth aspect may be such that M includes at least one element selected from the group consisting of Gd and Sm.

The positive electrode material according to the seventh aspect can attain a further enhancement in ion conductivity of the first solid electrolyte. Thus, the charge/discharge efficiency of a battery can be further enhanced.

In the eighth aspect of the present disclosure, for example, the positive electrode material according to any one of the first to the seventh aspect may be such that X includes at least one element selected from the group consisting of F, Cl and Br.

In the ninth aspect of the present disclosure, for example, the positive electrode material according to any one of the first to the eighth aspect may be such that X includes at least two elements selected from the group consisting of F, Cl and Br.

In the tenth aspect of the present disclosure, for example, the positive electrode material according to any one of the first to the ninth aspect may be such that X includes Cl and Br.

According to the above configurations, the ion conductivity of the first solid electrolyte can be further enhanced. Thus, the positive electrode material can further enhance the charge/discharge efficiency of a battery.

In the eleventh aspect of the present disclosure, for example, the positive electrode material according to any one of the first to the tenth aspect may be such that the positive electrode active material includes a lithium-containing transition metal oxide.

The positive electrode material according to the eleventh aspect can enhance the energy density of a battery.

A battery according to the twelfth aspect of the present disclosure includes:

a positive electrode including the positive electrode material according to any one of the first to the eleventh aspect;

a negative electrode; and an electrolyte layer disposed between the positive electrode and the negative electrode.

The battery according to the twelfth aspect can attain a low resistance and can further achieve an enhancement in charge/discharge efficiency.

In the thirteenth aspect of the present disclosure, for example, the battery according to the twelfth aspect may be such that the electrolyte layer includes a sulfide solid electrolyte.

The battery according to the thirteenth aspect can attain a low resistance and can further achieve an enhancement in charge/discharge efficiency.

Hereinbelow, embodiments of the present disclosure will be described with reference to the drawings.

Embodiment 1

FIG. 1 is a sectional view illustrating a schematic configuration of a positive electrode material 1000 according to the embodiment 1. The positive electrode material 1000 in the embodiment 1 includes a first solid electrolyte 100, a positive electrode active material 110, and a coating material 111 covering at least part of the surface of the positive electrode active material 110. The first solid electrolyte 100 and the positive electrode active material 110 may be particles. The coating material 111 may cover the entire surface of the positive electrode active material 110, or may partially cover the surface of the positive electrode active material 110. That is, the coating material 111 covers at least part of the surface of the positive electrode active material 110. In other words, the positive electrode active material 110 and the first solid electrolyte 100 share a portion in which the positive electrode active material 110 and the first solid electrolyte 100 are separated from each other by the coating material 111 and are out of contact with each other. The positive electrode active material 110 and the first solid electrolyte 100 may be partially in contact with each other.

The first solid electrolyte 100 is represented by the following compositional formula (1):

$$Li_aM_bX_c \qquad \text{Formula (1)}$$

In the compositional formula (1), a, b and c are each independently a positive real number. M includes calcium, yttrium, and at least one rare earth element other than yttrium. X includes at least one selected from the group consisting of F, Cl, Br and I.

In the positive electrode material 1000 in the present embodiment, the coating material 111 is interposed between the positive electrode active material 110 and the first solid electrolyte 100 that is a halide solid electrolyte. The coating material 111 inhibits the transfer of electrons to and from the halide solid electrolyte even when the potential of the positive electrode is elevated during charging of a battery. That is, the halogen in the first solid electrolyte 100 is prevented from oxidation reaction, and consequently the decomposition of the first solid electrolyte 100 as well as the generation of halogen gas stemming from oxidation reaction are eliminated or reduced. As a result, the first solid electrolyte 100 is prevented from degradation, and no or a small decrease is attained in the effective reaction area between the positive electrode active material 110 and the first solid electrolyte 100. For these reasons, the positive electrode material 1000 in the present embodiment can reduce the resistance of a battery. As a result, furthermore, the positive electrode material 1000 according to the embodiment 1 allows a battery to attain an enhanced charge/discharge efficiency.

As described hereinabove, the coating material 111 may uniformly cover the entire surface of the positive electrode active material 110. In this case, the positive electrode active material 110 and the first solid electrolyte 100 are prevented from direct contact with each other, and the oxidation reaction of the first solid electrolyte 100 can be eliminated or reduced more reliably. Thus, charge/discharge characteristics of a battery can be further enhanced, and the increase in reaction overvoltage of a battery can be reduced.

The coating material 111 may cover only a portion of the surface of the positive electrode active material 110. The particles of the positive electrode active material 110 can be in direct contact with one another through the portions exposed from the coating material 111, and consequently the electron conductivity between the particles of the positive electrode active material 110 is enhanced. Thus, a battery may be operated at a high output.

For example, the coating material 111 may be a material having low electron conductivity. For example, an O-containing material may be used as the coating material 111. Examples of the O-containing materials include oxide materials and oxide solid electrolytes.

Examples of the oxide materials that may be used as the coating materials 111 include $SiO_2$, $Al_2O_3$, $TiO_2$, $B_2O_3$, $Nb_2O_5$, $WO_3$ and $ZrO_2$. Examples of the oxide solid electrolytes that may be used as the coating materials 111 include Li—P—O compounds such as $Li_3PO_4$, Li—Nb—O compounds such as $LiNbO_3$, Li—B—O compounds such as $LiBO_2$ and $Li_3BO_3$, Li—Al—O compounds such as $LiAlO_2$, Li—Si—O compounds such as $Li_4SiO_4$, Li—Ti—O compounds such as $Li_4Ti_5O_{12}$, Li—Zr—O compounds such as $Li_2ZrO_3$, Li—Mo—O compounds such as $Li_2MoO_3$, Li—V—O compounds such as $LiV_2O_5$, Li—W—O compounds such as $Li_2WO_4$, and $Li_2SO_4$.

The coating material 111 may include an oxide solid electrolyte. Oxide solid electrolytes have high ion conductivity and high stability at high potentials. Thus, the charge/discharge efficiency may be further enhanced by using an oxide solid electrolyte.

The coating material 111 may include an oxoacid salt. When the coating material 111 includes an oxoacid salt, the resistance of a battery can be reduced more effectively. The oxoacid salt may be an oxoacid salt having a nonmetal or a semimetal as a cation. As described above, the "semimetal elements" are B, Si, Ge, As, Sb and Te. The "nonmetal elements" are N, P, S, Cl, Br and I. Specifically, these elements are elements that bond to oxygen to form oxoacids.

The coating material 111 may include at least one selected from the group consisting of B, N, P, S and Si.

The coating material 111 that includes at least one selected from the group consisting of B, N, P, S and Si can form a covering having low electron conductivity on the surface of the positive electrode active material 110. Thus, the positive electrode material 1000 in the embodiment 1 can attain a further reduction in the probability that the first solid electrolyte 100 may be oxidized. Such elements as B, N, P, S and Si form strong covalent bonds with oxygen. Thus, electrons in the coating material 111 are delocalized, and a covering formed of such a coating material 111 exhibits low electron conductivity. That is, such a covering can block the transfer of electrons between the positive electrode active material 110 and the first solid electrolyte 100 even when the thickness of the coating material 111 on the surface of the positive electrode active material 110 is small, and thus can eliminate or reduce the oxidation reaction of the first solid electrolyte 100 more effectively. Thus, by virtue of the coating material 111 including at least one selected from the group consisting of B, N, P, S and Si, the positive electrode material 1000 can reduce the resistance of a battery more effectively and can further enhance the charge/discharge efficiency.

The coating material 111 may include Li. This configuration can increase the carrier concentration at the interface between the positive electrode active material 110 and the first solid electrolyte 100, and thus can reduce the resistance of a battery more effectively.

When the coating material 111 includes Li, the molar ratio Li/(other cations) of lithium to other cations in the coating material 111 may be greater than or equal to 0.8 and less than or equal to 3.6, or may be greater than or equal to 1.0 and less than or equal to 3.0. When the molar ratio Li/(other cations) is greater than or equal to 0.8 and less than or equal to 3.6, the lithium ion conductivity in the coating material 111 can be increased. Thus, the resistance of a battery can be reduced more effectively.

The coating material 111 may include a glass-forming oxide such as phosphate or silicate. Here, the glass-forming oxide means a network-forming oxide that can form glass by itself. The element that serves as a cation in the glass-forming oxide, that is, the element called a network former may be, for example, Si, P, B, Ge or V. The coating material 111 including a glass-forming oxide can exhibit higher lithium ion conductivity in the coating material 111. Specifically, the coating material 111 that includes a lithium compound of an oxide called a glass-forming oxide such as phosphate or silicate forms a partially amorphous covering having wide ion conductive paths. Thus, the lithium ion conductivity in the coating material 111 can be increased, and the resistance of a battery may be reduced more effectively.

The coating material 111 may include an intermediate oxide such as niobate. Here, the intermediate oxide means an oxide that cannot form glass by itself (that is, cannot form a glass network by itself) but can form glass or enter the glass network depending on the composition. The element that serves as a cation in the intermediate oxide may be, for example, Nb, Ti, Zn, Al or Zr. The coating material 111 that includes an intermediate oxide can exhibit higher lithium ion conductivity in the coating material 111. Specifically, the coating material 111 that includes a lithium compound of an oxide called an intermediate oxide such as niobate forms a partially amorphous covering having wide ion conductive paths. Thus, the lithium ion conductivity in the coating material 111 can be increased, and the resistance of a battery may be reduced more effectively.

The coating material 111 may include at least one selected from the group consisting of lithium phosphate and lithium niobate.

Lithium phosphate and lithium niobate can increase the lithium ion conductivity of the coating material 111. Thus, the positive electrode material 1000 of the present embodiment can reduce the resistance of a battery more effectively.

The coating material 111 may include at least one selected from the group consisting of lithium phosphate and lithium niobate as a main component, and may further include inevitable impurities or impurities such as starting materials, byproducts and decomposition products used or occurring in the preparation of the coating material 111. Specifically, the coating material 111 may include lithium phosphate and lithium niobate in a total proportion relative to the mass of the whole of the coating material 111 of, for example, greater than or equal to 50% (greater than or equal to 50 mass %). For example, the coating material 111 may include lithium phosphate and lithium niobate in a total proportion of 100% (100 mass %) relative to the mass of the whole of the coating material 111 except inevitable impurities.

In the embodiment 1, the coating material 111 may be $LiNbO_3$. $LiNbO_3$ has higher ion conductivity and higher stability at high potentials. Thus, the charge/discharge efficiency of a battery can be further enhanced by using $LiNbO_3$.

When a battery is charged to raise the potential of the positive electrode while the positive electrode active material 110 and the first solid electrolyte 100 are in direct contact with each other, electrons are extracted from the first solid electrolyte 100 and the first solid electrolyte 100 is oxidized. This is prevented effectively by the coating material 111 interposed between the positive electrode active material 110 and the first solid electrolyte 100. However, the coating material 111 may sometimes also block the electronic contact between the positive electrode active material 110 and a conductive auxiliary or between particles of the positive electrode active material 110. In such a case, the coating material 111 interrupts electronic paths from the current collector of the battery to the particles of the positive electrode active material 110, and the isolated positive electrode active material 110 may not contribute to the charge/discharge reactions. That is, the apparent amount of the active material decreases and the reaction area is reduced to make it difficult to sufficiently reduce the resistance. An approach to this is to expose part of the surface of the positive electrode active material 110 from the coating material 111. In this manner, the oxidation reaction of the first solid electrolyte 100 can be eliminated or reduced while ensuring the electronic paths at the same time. For this reason, part of the surface of the positive electrode active material 110 may be exposed from the coating material 111.

In order to further eliminate or reduce the oxidation reaction of the first solid electrolyte 100 and to reduce the resistance of a battery more effectively, the coating material 111 may cover the surface of the positive electrode active material 110 in a ratio of the covered surface area to the total surface area of the positive electrode active material 110, namely, in a coverage ratio of greater than or equal to 18%. To reduce the resistance of a battery more effectively, the coverage ratio may be greater than or equal to 47%, may be greater than or equal to 90%, or may be 100%.

The coverage ratio may be determined by separating O1s peaks in X-ray photoelectron spectroscopy (XPS). When, for example, $Li(Ni, Co, Mn)O_2$ is used as the positive electrode active material 110 and lithium phosphate is used as the coating material 111, the coverage ratio may be determined by subtracting the O1s peak assigned to carbonic acid near 531 eV from the O1s peak near 532 eV, and dividing the area of the O1s peak assigned to the positive electrode active material and reaching the peak top at about 529 eV by the area of the peak resulting from the above subtraction.

When the accurate determination of the coverage ratio is difficult by the above method, the elemental amounts of metals, for example, Ni, Co and Mn in the positive electrode active material 110, and the elemental amount of cation species, for example, P or Si in the coating material 111 may be measured by XPS, and the coverage ratio may be determined from the ratio of these amounts.

The coverage ratio may also be determined with respect to a backscattered electron image obtained with a scanning electron microscope (SEM), based on the difference in contrast stemming from the difference in composition between the active material and the coating material.

The coverage ratio may also be determined by mapping the constituent elements in the active material and the coating material using energy-dispersive X-ray spectroscopy (EDX).

The mass ratio of the coating material 111 to the positive electrode active material 110 may be less than or equal to 2.0 mass %, or may be less than or equal to 1.5 mass %. This configuration can increase the proportion of the positive electrode active material 110 or the first solid electrolyte 100 in the positive electrode, and thus can increase the energy density of a battery.

The mass ratio of the coating material 111 to the positive electrode active material 110 may be greater than or equal to 0.1 mass %, or may be greater than or equal to 0.5 mass %. This configuration can increase the proportion of the positive electrode active material 110 or the first solid electrolyte 100 in the positive electrode, and thus can increase the energy density of a battery.

The mass ratio of the coating material 111 to the positive electrode active material 110 may be greater than or equal to 0.5 mass % and less than or equal to 2.0 mass %. This configuration can increase the proportion of the positive electrode active material 110 or the first solid electrolyte 100 in the positive electrode, and thus can increase the energy density of a battery.

The mass ratio of the coating material 111 to the positive electrode active material 110 may be greater than or equal to 0.5 mass % and less than or equal to 1.5 mass %.

To determine the mass ratio of the coating material 111 to the positive electrode active material 110, for example, the positive electrode may be dissolved with a solvent such as an acid to form an aqueous solution, the solution may be analyzed by inductively coupled plasma (ICP) emission spectroscopy to quantify the elements that are contained, and the amounts may be expressed as the mass ratio. In this process, the mass ratio may be determined based on the quantified amounts of elements that are contained in either the positive electrode active material 110 or the coating material 111, assuming that the compositions are stoichiometric. When, for example, $LiNiO_2$ is covered with $Li_3PO_4$, the mass ratio of the coating material 111 may be determined from the quantified amounts of Ni and P assuming that $LiNiO_2$ and $Li_3PO_4$ are each present in a stoichiometric composition.

In the compositional formula (1), the at least one rare earth element other than yttrium that is included in M may be elements including Sc and a lanthanoid element. For example, the lanthanoid elements are La, Ce, Pr, Nd, Pm, Sm, Eu, Gd, Tb, Dy, Ho, Er, Tm, Yb and Lu. The rare earth elements have similar chemical properties and thus are all usable as elements for constituting the halide solid electrolyte in the present embodiment.

In the compositional formula (1), M may include calcium, yttrium, and one rare earth element other than yttrium. M may include at least one rare earth element other than yttrium, and may include only one rare earth element other than yttrium.

In the compositional formula (1), M may include at least one selected from the group consisting of Gd and Sm.

In the compositional formula (1), M may include only one selected from the group consisting of Gd and Sm.

According to the above configurations, the ion conductivity of the first solid electrolyte 100 can be further enhanced. Thus, the charge/discharge efficiency of a battery can be further enhanced.

In the compositional formula (1), X may include at least one element selected from the group consisting of F, Cl and Br. In the compositional formula (1), X may include at least two elements selected from the group consisting of F, Cl and Br. In the compositional formula (1), X may include Cl and Br. According to these configurations, the ion conductivity of the first solid electrolyte 100 can be further enhanced. Thus, the charge/discharge efficiency of a battery can be further enhanced.

The first solid electrolyte 100 may be represented by the following compositional formula (2):

$$Li_{6-2a-3d}Ca_a(Y_{1-b}Gd_b)_dBr_{6-c}Cl_c \qquad \text{Formula (2)}$$

The compositional formula (2) satisfies $0<a$, $0<b<1$, $0<c<6$, and $0<d<1.5$.

According to the above configuration, the ion conductivity of the first solid electrolyte 100 can be further enhanced. Thus, the charge/discharge efficiency of a battery can be further enhanced.

The compositional formula (2) may satisfy $0.01 \leq a \leq 0.3$.

According to the above configuration, the ion conductivity of the first solid electrolyte 100 can be further enhanced. Thus, the charge/discharge efficiency of a battery can be further enhanced.

The compositional formula (2) may satisfy $a \leq 0.2$.

According to the above configuration, the ion conductivity of the first solid electrolyte 100 can be further enhanced. Thus, the charge/discharge efficiency of a battery can be further enhanced.

The compositional formula (2) may satisfy $0.1 \leq b \leq 0.9$.

According to the above configuration, the ion conductivity of the first solid electrolyte 100 can be further enhanced. Thus, the charge/discharge efficiency of a battery can be further enhanced.

The compositional formula (2) may satisfy $0.8 \leq b < 1$.

According to the above configuration, the ion conductivity of the first solid electrolyte 100 can be further enhanced. Thus, the charge/discharge efficiency of a battery can be further enhanced.

The compositional formula (2) may satisfy $1.0 \leq c \leq 1.2$.

According to the above configuration, the ion conductivity of the first solid electrolyte 100 can be further enhanced. Thus, the charge/discharge efficiency of a battery can be further enhanced.

The first solid electrolyte 100 and the halide solid electrolyte may be free from sulfur.

For example, the positive electrode active material 110 is a material capable of occluding and releasing metal ions (for example, lithium ions). Examples of the positive electrode active materials include lithium-containing transition metal oxides, transition metal fluorides, polyanionic materials, fluorinated polyanionic materials, transition metal sulfides, transition metal oxysulfides and transition metal oxynitrides. Examples of the lithium-containing transition metal oxides include $Li(NiCoAl)O_2$, $Li(NiCoMn)O_2$ and $LiCoO_2$. When, for example, a lithium-containing transition metal oxide is used as the positive electrode active material, the manufacturing cost of the positive electrode can be reduced and the average discharge voltage can be increased.

In order to increase the energy density of a battery, the positive electrode active material 110 may be lithium nickel cobalt manganese oxide. For example, the positive electrode active material 110 may be Li(NiCoMn)O$_2$.

According to the above configuration, the energy density and the charge/discharge efficiency of a battery can be further increased.

The thickness of the coating material 111 may be greater than or equal to 1 nm and less than or equal to 100 nm.

The coating material 111 having a thickness of greater than or equal to 1 nm can prevent direct contact between the positive electrode active material 110 and the first solid electrolyte 100, and thus can eliminate or reduce the side reaction of the first solid electrolyte 100, thereby enhancing the charge/discharge efficiency.

Furthermore, the coating material 111 having a thickness of less than or equal to 100 nm is not excessively thick. Such a coating material 111 can ensure a sufficiently low internal resistance of a battery. As a result, the energy density of a battery can be increased.

The thickness of the coating material 111 may be greater than or equal to 2 nm and less than or equal to 20 nm.

The coating material 111 having a thickness of greater than or equal to 2 nm can prevent direct contact between the positive electrode active material 110 and the first solid electrolyte 100 more efficiently, and thus can eliminate or reduce the side reaction of the first solid electrolyte 100. Thus, the charge/discharge efficiency can be enhanced more efficiently.

Furthermore, the coating material 111 having a thickness of less than or equal to 20 nm can ensure a lower internal resistance of a battery. As a result, the energy density of a battery can be increased. The thickness of the coating material 111 may be less than or equal to 40 nm.

The thickness of the coating material 111 may be measured by any technique without limitation. For example, the thickness of the coating material 111 may be determined by direct observation using a device such as a transmission electron microscope. Alternatively, the thickness may be determined by Ar while following the change in the XPS spectrum assigned to the active material while removing the coating layer with Ar sputtering.

The shape of the first solid electrolyte 100 in the embodiment 1 is not particularly limited and may be, for example, acicular, spherical, elliptical spherical or other shape. For example, the shape of the first solid electrolyte 100 may be particulate.

When, for example, the shape of the first solid electrolyte 100 in the embodiment 1 is particulate (for example, spherical), the median diameter may be less than or equal to 100 μm. If the median diameter is greater than 100 μm, the positive electrode active material 110 and the first solid electrolyte 100 may not be favorably dispersed in the positive electrode material 1000 to cause a decrease in charge/discharge characteristics. In the embodiment 1, the median diameter may be less than or equal to 10 μm.

The above configuration ensures that the positive electrode active material 110 and the first solid electrolyte 100 can be favorably dispersed in the positive electrode material 1000.

In the embodiment 1, the median diameter of the first solid electrolyte 100 may be smaller than the median diameter of the positive electrode active material 110.

The above configuration ensures that the first solid electrolyte 100 and the positive electrode active material 110 can be more favorably dispersed in the positive electrode material 1000.

The median diameter of the positive electrode active material 110 may be greater than or equal to 0.1 μm and less than or equal to 100 μm.

When the median diameter of the positive electrode active material 110 in the positive electrode material 1000 is greater than or equal to 0.1 μm, the positive electrode active material 110 and the first solid electrolyte 100 can be favorably dispersed in the positive electrode material 1000. As a result, charge/discharge characteristics of a battery are enhanced. When the median diameter of the positive electrode active material 110 is less than or equal to 100 μm, a sufficient rate of diffusion of lithium in the positive electrode active material 110 is ensured to allow a battery to be operated at a high output.

The median diameter of the positive electrode active material 110 may be larger than the median diameter of the first solid electrolyte 100. In this case, the positive electrode active material 110 and the first solid electrolyte 100 can be favorably dispersed.

The median diameter means the particle size at 50% cumulative volume in the volume-based grain size distribution. The volume-based grain size distribution is measured with, for example, a laser diffraction measurement device or an image analyzer.

In the positive electrode material 1000 in the embodiment 1, the first solid electrolyte 100 and the coating material 111 may be in contact with each other as illustrated in FIG. 1.

The positive electrode material 1000 in the embodiment 1 may include a plurality of particulate first solid electrolytes 100 and a plurality of particulate positive electrode active materials 110.

In the positive electrode material 1000 in the embodiment 1, the content of the first solid electrolyte 100 and the content of the positive electrode active material 110 may be the same as or different from each other.

<Methods for Producing the First Solid Electrolyte>

For example, the first solid electrolyte in the embodiment 1 may be produced by the following method.

Ingredient powders are provided in a blending ratio that will give the target composition, and the powders are mixed with one another. For example, the ingredient powders are oxides, hydroxides, halides or acid halides. When, for example, Li$_3$YBr$_3$Cl$_3$ is the target product, LiBr and YCl$_3$ are provided in a molar ratio of 3:1.

The "M" and the "X" in the above-described compositional formula (1) may be determined by selecting the types of the ingredient powders. The values of "a", "b" and "c" may be controlled by controlling the blending ratio of the ingredients, and selecting the synthesis process.

After being mixed together sufficiently, the ingredient powders are mixed, crushed and reacted using a mechanochemical milling method. Alternatively, the ingredient powders after being sufficiently mixed may be sintered in vacuum.

The first solid electrolyte may be obtained in the manner described above.

The structure of crystal phases (that is, the crystal structure) in the solid electrolyte may be determined by selecting the reaction method and the reaction conditions for the ingredient powders.

<Methods for Producing the Positive Electrode Active Material Covered with the Coating Material>

The positive electrode active material 110 covered with the coating material 111 may be produced by the following method.

First, a powder of the positive electrode active material 110 is provided. For example, a powder of the positive electrode active material 110 may be produced by a copre-cipitation method. In the coprecipitation method, the posi-tive electrode active material 110 may be produced by preparing a metal oxide as a precursor and heat-treating the precursor together with a lithium source. Alternatively, the positive electrode active material 110 may be easily pur-chased from powders with various compositions sold in the market.

Next, the surface of the particles of the positive electrode active material 110 is covered with the coating material 111. The coating material 111 may be applied by any method without limitation. For example, the coating material 111 may be applied by a liquid-phase coating method or a vapor-phase coating method.

In the liquid-phase coating method, for example, a pre-cursor solution of the coating material 111 is applied to the surface of the positive electrode active material 110. When forming a coating material 111 containing lithium phos-phate, the precursor solution may be a mixed solution of a solvent, lithium hydroxide and triethyl phosphate.

The ingredients are not particularly limited as long as the ingredients can be dissolved or dispersed in a solvent. Examples of the lithium sources include alkyllithiums such as tert-butyllithium, lithium alkoxides such as lithium methoxide, lithium ethoxide, lithium isopropoxide and lithium tert-butoxide, lithium iodide, lithium bromide, lithium chloride, lithium carbonate, lithium nitrate, lithium sulfate and metallic lithium. Examples of the phosphoric acid sources include trimethyl phosphate, tripropyl phos-phate, tributyl phosphate, phosphoric acid, monoammonium dihydrogen phosphate, diammonium monohydrogen phos-phate and triammonium phosphate. Ingredients including phosphoric acid and lithium may be used.

For example, the solvent is an alcohol such as ethanol. However, the solvent is not limited as long as the solvent can dissolve the ingredients or allows the ingredients to disperse. The solvent may be selected from various types of solvents depending on the ingredients. Examples of the solvents include methanol, propanol, isopropanol, butanol, dimethyl carbonate, diethyl carbonate, ethyl methyl carbonate, dim-ethyl sulfoxide, tetrahydrofuran, hexane, benzene, toluene, methylene chloride, acetone and acetonitrile.

The amounts of lithium hydroxide and triethyl phosphate are controlled in accordance with the target composition of the coating material 111. Where necessary, water may be added to the precursor solution. The precursor solution may be acidic or alkaline.

Embodiment 2

Hereinbelow, the embodiment 2 will be described. Over-laps with the description of the embodiment 1 will be omitted appropriately.

FIG. 2 is a sectional view illustrating a schematic con-figuration of a battery 2000 according to the embodiment 2.

The battery 2000 in the embodiment 2 includes a positive electrode 201, an electrolyte layer 202 and a negative electrode 203.

The positive electrode 201 includes the positive electrode material 1000 in the embodiment 1.

The electrolyte layer 202 is arranged between the positive electrode 201 and the negative electrode 203.

With the above configuration, the battery 2000 can attain a low resistance.

The volume ratio "v1:100−v1" between the positive elec-trode active material 110 and the first solid electrolyte 100 present in the positive electrode 201 may satisfy 30≤v1≤95.

Here, v1 indicates the volume proportion of the positive electrode active material 110 relative to the total volume of the positive electrode active material 110 and the first solid electrolyte 100 present in the positive electrode 201 taken as 100. When 30≤v1 is satisfied, the battery 2000 may attain a sufficient energy density. When v1≤95 is satisfied, the bat-tery 2000 may be operated at a high output more easily.

The thickness of the positive electrode 201 may be greater than or equal to 10 μm and less than or equal to 500 μm. The positive electrode 201 having a thickness of greater than or equal to 10 μm may ensure a sufficient energy density of the battery 2000. When the thickness of the positive electrode 201 is less than or equal to 500 μm, the battery 2000 may be operated at a high output.

The electrolyte layer 202 is disposed between the positive electrode 201 and the negative electrode 203.

The electrolyte layer 202 is a layer including an electro-lyte material. For example, the electrolyte material is a solid electrolyte (a second solid electrolyte). That is, the electro-lyte layer 202 may be a solid electrolyte layer.

The second solid electrolyte present in the electrolyte layer 202 may be the same as the first solid electrolyte in the embodiment 1. That is, the electrolyte layer 202 may include the first solid electrolyte in the embodiment 1.

The above configuration ensures that the battery 2000 can attain a further enhancement in charge/discharge efficiency.

The second solid electrolyte present in the electrolyte layer 202 may be a halide solid electrolyte differing from the first solid electrolyte in the embodiment 1. That is, the electrolyte layer 202 may include a halide solid electrolyte differing from the first solid electrolyte in the embodiment 1.

The above configuration ensures that the battery 2000 can attain enhancements in output density and charge/discharge efficiency.

The halide solid electrolyte present in the electrolyte layer 202 may include Y as a metal element.

The above configuration ensures that the battery can attain further enhancements in output density and charge/discharge efficiency.

The halide solid electrolyte present in the electrolyte layer 202 may be a material described hereinabove as the first solid electrolyte in the embodiment 1.

The second solid electrolyte present in the electrolyte layer 202 may be a sulfide solid electrolyte. That is, the electrolyte layer 202 may include a sulfide solid electrolyte.

According to the above configuration, the electrolyte layer 202 includes a sulfide solid electrolyte that has excel-lent reduction stability, and thus a low-potential material such as graphite or metallic lithium can be used as the negative electrode material. Thus, the battery 2000 can attain an enhancement in energy density.

For example, the sulfide solid electrolyte that is used may be $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$ or $Li_{10}GeP_2S_{12}$. For example, LiX (X: F, Cl, Br, I), $Li_2O$, $MO_q$ or $Li_pMO_q$ (M: any of P, Si, Ge, B, Al, Ga, In, Fe and Zn) (p and q: natural numbers) may be added to the above sulfide solid electrolytes.

The second solid electrolyte present in the electrolyte layer 202 may be an oxide solid electrolyte, a polymer solid electrolyte or a complex hydride solid electrolyte.

Examples of the oxide solid electrolytes that may be used include NASICON-type solid electrolytes represented by $LiTi_2(PO_4)_3$ and element-substituted derivatives thereof, Perovskite-type solid electrolytes such as $(LaLi)TiO_3$ sys-tem, LISICON-type solid electrolytes represented by $Li_{14}ZnGe_4O_{16}$, $Li_4SiO_4$, $LiGeO_4$ and element-substituted derivatives thereof, garnet-type solid electrolytes represented by $Li_7La_3Zr_2O_{12}$ and element-substituted derivatives thereof, $Li_3N$ and H-substituted derivatives thereof, $Li_3PO_4$ and N-substituted derivatives thereof, and glass or glass ceramic electrolytes based on a Li—B—O compound such as $LiBO_2$ or $Li_3BO_3$ and containing such a material as $Li_2SO_4$ or $Li_2CO_3$.

Examples of the polymer solid electrolytes that may be used include compounds formed between a polymer compound and a lithium salt. The polymer compound may have an ethylene oxide structure. By having an ethylene oxide structure, the polymer compound can contain a large amount of the lithium salt and thus can offer higher ion conductivity. Examples of the lithium salts that may be used include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$ and $LiC(SO_2CF_3)_3$. The lithium salt that is used may be a single kind of lithium salt selected from those described above, or may be a mixture of two or more kinds of lithium salts selected from those described above.

Examples of the complex hydride solid electrolytes that may be used include $LiBH_4$—$LiI$ and $LiBH_4$—$P_2S_5$.

The electrolyte layer 202 may include the second solid electrolyte as a main component. That is, the electrolyte layer 202 may include the second solid electrolyte in a weight ratio of, for example, greater than or equal to 50% (greater than or equal to 50 wt %) relative to the whole of the electrolyte layer 202.

The above configuration ensures that the battery 2000 can attain further enhancements in charge/discharge characteristics.

For example, the electrolyte layer 202 may include the second solid electrolyte in a weight ratio of greater than or equal to 70% (greater than or equal to 70 wt %) relative to the whole of the electrolyte layer 202.

The above configuration ensures that the battery 2000 can attain further enhancements in charge/discharge characteristics.

The electrolyte layer 202 may include the second solid electrolyte as a main component and may further include inevitable impurities, or impurities such as starting materials, byproducts and decomposition products used or occurring in the synthesis of the second solid electrolyte.

For example, the electrolyte layer 202 may include the second solid electrolyte in a weight ratio of 100% (100 wt %) relative to the whole of the electrolyte layer 202 except inevitable impurities.

The above configuration ensures that the battery can attain further enhancements in charge/discharge characteristics.

As described above, the electrolyte layer 202 may be composed solely of the second solid electrolyte.

The electrolyte layer 202 may include two or more kinds of materials described above as the second solid electrolytes. For example, the electrolyte layer 202 may include a halide solid electrolyte and a sulfide solid electrolyte.

The thickness of the electrolyte layer 202 may be greater than or equal to 1 μm and less than or equal to 300 μm. When the thickness of the electrolyte layer 202 is greater than or equal to 1 μm, a short-circuit is unlikely to occur between the positive electrode 201 and the negative electrode 203. When the thickness of the electrolyte layer 202 is less than or equal to 300 μm, the battery may be operated at a high output easily. That is, appropriate control of the thickness of the electrolyte layer 202 ensures sufficient safety of the battery 2000 and allows the battery 2000 to be operated at a high output.

The negative electrode 203 includes a material that is capable of occluding and releasing metal ions (for example, lithium ions). For example, the negative electrode 203 includes a negative electrode active material.

Examples of the negative electrode active materials that may be used include metal materials, carbon materials, oxides, nitrides, tin compounds and silicon compounds. The metal materials may be elemental metals. Alternatively, the metal materials may be alloys. Examples of the metal materials include lithium metal and lithium alloys. Examples of the carbon materials include natural graphite, coke, semi-graphitized carbon, carbon fibers, spherical carbon, artificial graphite and amorphous carbon. From the point of view of capacity density, silicon (Si), tin (Sn), silicon compounds and tin compounds may be suitably used.

The negative electrode 203 may include a third solid electrolyte. This configuration enhances the lithium ion conductivity inside the negative electrode 203 and allows the battery to be operated at a high output. The third solid electrolyte present in the negative electrode 203 may be a material described hereinabove as an example of the second solid electrolyte in the electrolyte layer 202.

The median diameter of particles of the negative electrode active material may be greater than or equal to 0.1 μm and less than or equal to 100 μm. When the median diameter of the particles of the negative electrode active material is greater than or equal to 0.1 μm, the particles of the negative electrode active material and the solid electrolyte may be more favorably dispersed in the negative electrode. Thus, the battery attains enhancements in charge/discharge characteristics. When the median diameter of the particles of the negative electrode active material is less than or equal to 100 μm, lithium can be diffused at a sufficient rate in the negative electrode active material. Thus, the battery may be operated at a high output.

The median diameter of the particles of the negative electrode active material may be larger than the median diameter of the third solid electrolyte. In this case, the particles of the negative electrode active material and the solid electrolyte can be favorably dispersed.

The volume ratio "v2:100−v2" between the particles of the negative electrode active material and the solid electrolyte present in the negative electrode 203 may satisfy $30 \leq v2 \leq 95$. Here, v2 indicates the volume proportion of the particles of the negative electrode active material relative to the total volume of the particles of the negative electrode active material and the solid electrolyte present in the negative electrode 203 taken as 100. When $30 \leq v2$ is satisfied, the battery 2000 may attain a sufficient energy density. When $v2 \leq 95$ is satisfied, the battery 2000 may be operated at a high output more easily.

The thickness of the negative electrode 203 may be greater than or equal to 10 μm and less than or equal to 500 μm. The negative electrode 203 having a thickness of greater than or equal to 10 μm may ensure a sufficient energy density of the battery 2000. When the thickness of the negative electrode 203 is less than or equal to 500 μm, the battery 2000 may be operated at a high output more easily.

At least one selected from the group consisting of the positive electrode 201, the electrolyte layer 202 and the negative electrode 203 may include a binder for the purpose of enhancing the adhesion between the particles. Binders are used to enhance binding properties of a material forming an electrode. Examples of the binders include polyvinylidene fluoride, polytetrafluoroethylene, polyethylene, polypropylene, aramid resins, polyamides, polyimides, polyamideimides, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrroli-done, polyethers, polyether sulfones, hexafluoropolypropyl-ene, styrene butadiene rubbers and carboxymethylcellulose. Examples of the binders that may be used further include copolymers of two or more materials selected from tet-rafluoroethylene, hexafluoroethylene, hexafluoropropylene, perfluoroalkyl vinyl ethers, vinylidene fluoride, chlorotrif-luoroethylene, ethylene, propylene, pentafluoropropylene, fluoromethyl vinyl ether, acrylic acid and hexadiene. Fur-thermore, a mixture of two or more materials selected from the above may be used as the binder.

At least one of the positive electrode 201 or the negative electrode 203 may include a conductive auxiliary for the purpose of enhancing electron conductivity. Examples of the conductive auxiliaries that may be used include graphites such as natural graphite and artificial graphite, carbon blacks such as acetylene black and Ketjen black, conductive fibers such as carbon fibers and metal fibers, fluorocarbons, metal powders such as aluminum, conductive whiskers such as zinc oxide and potassium titanate, conductive metal oxides such as titanium oxide, and conductive polymer compounds such as polyaniline, polypyrrole and polythiophene. The use of a carbon conductive auxiliary allows for cost reduction.

The batteries 2000 in the embodiment 2 may be formed into various shapes such as coin, cylindrical, prismatic, sheet, button, flat and laminate.

For example, the battery 2000 in the embodiment 2 may be produced by providing the positive electrode material 1000 in the embodiment 1, a material for forming the electrolyte layer, and a material for forming the negative electrode, and fabricating a stack by a known method so as to arrange the positive electrode, the electrolyte layer and the negative electrode in this order.

EXAMPLES

Hereinbelow, the present disclosure will be described in greater detail with reference to Examples and Comparative Examples.

Example 1

[Preparation of Positive Electrode Active Material Covered with Coating Material on the Surface]

In an argon glove box having a dew point of less than or equal to −60° C., 6.3 mg of lithium hydroxide and 16.0 mg of triethyl phosphate were dissolved into an appropriate amount of super-dehydrated ethanol (manufactured by Wako Pure Chemical Industries, Ltd.) to give a coating material solution. In the coating material solution, the molar ratio of lithium to phosphorus was 3:1.

2 g of Li(NiCoMn)O$_2$ (hereinafter, written as NCM) as a positive electrode active material was provided on an agate mortar, and the coating material solution prepared was gradually added thereto while performing stirring.

After all the coating material solution had been added, stirring was performed until dryness was visually confirmed.

The resultant dry powder was placed into an alumina crucible and was heat-treated in an oxygen atmosphere at 400° C. for 3 hours.

The heat-treated powder was reground in an agate mortar to give a positive electrode active material of Example 1 covered with the coating material on the surface. The coating material was lithium phosphate (Li$_3$PO$_4$).

[Preparation of First Solid Electrolyte]

In an argon atmosphere having a dew point of less than or equal to −60° C., LiCl, LiBr, CaBr$_2$, YCl$_3$ and GdCl$_3$ as ingredient powders were provided in a molar ratio of LiCl:LiBr:CaBr$_2$:YCl$_3$:GdCl$_3$=1.0:1.8:0.1:0.6:0.4. These pow-ders were ground and mixed in a mortar. Subsequently, the resultant mixture of the ingredient powders was heat-treated in an argon atmosphere using an electric furnace at 500° C. for 3 hours. The material obtained was ground using a pestle and a mortar. Thus, a powder of a first solid electrolyte was obtained. The first solid electrolyte of Example 1 is herein-after written to as the "HSE".

[Fabrication of Battery]

In an argon atmosphere having a dew point of less than or equal to −60° C., the positive electrode active material NCM covered with lithium phosphate as the coating material, the first solid electrolyte HSE, and vapor-grown carbon fibers (VGCF) as a conductive auxiliary were provided. The mass ratio of the NCM, the HSE and the VGCF was NCM:HSE:VGCF=80:18:2. These were mixed together in an agate mortar to give a positive electrode mixture.

A stack was formed in an insulating cylinder by adding a sulfide solid electrolyte, Li$_6$PS$_5$Cl, (80 mg), the HSE powder (20 mg) and the positive electrode mixture (18.2 mg) in this order. A pressure of 720 MPa was applied to form a positive electrode and a solid electrolyte layer.

Next, a Li foil was laminated onto the side of the electrolyte layer opposite from the side in contact with the positive electrode. The resultant stack was pressed at a pressure of 80 MPa. A stack composed of the positive electrode, the solid electrolyte layer and the negative elec-trode was thus prepared. The negative electrode was the Li foil.

Next, stainless steel current collectors were placed on and under the stack. Current collector leads were attached to the current collectors. Lastly, the insulating cylinder was tightly closed with insulating ferrules to isolate the inside of the cylinder from the outer atmosphere.

Thus, a battery of Example 1 was fabricated.

[Charge/Discharge Test]

The battery of Example 1 was placed in a thermostatic chamber at 25° C. The battery was charged at a constant current of 0.140 mA until the voltage reached 4.3 V. Next, the battery was discharged at a current of 0.140 mA until the voltage fell to 2.5 V.

[Measurement of Resistance]

FIG. 3 is a view illustrating a Nyquist diagram of the battery of Example 1 at 3.7 V. The battery of Example 1 was placed in a thermostatic chamber at 25° C. Furthermore, the battery was connected to a potentiostat equipped with a frequency response analyzer. Subsequently, the battery was charged at a constant current of 0.140 mA until the voltage reached 3.7 V and was further charged at the constant voltage. The frequency dependence of resistance compo-nents was evaluated by an AC impedance method. In this process, a resistance component that appeared near 10$^5$-10$^2$ Hz was separated by curve fitting and was obtained as the resistance at the active material-solid electrolyte interface. By the measurement, the resistance of Example 1 was estimated to be 140 ohm.

[Measurement of Coverage Ratio]

Figure 4:
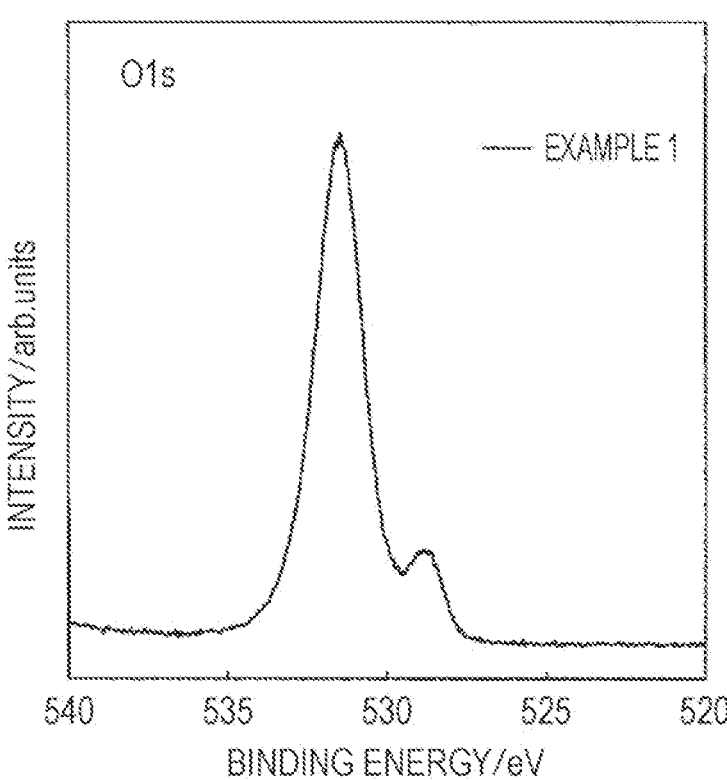
FIG. 4 is a view illustrating an O1s spectrum of an active material used in Example 1 according to X-ray photoelectron spectroscopy.

FIG. 4 is a view illustrating an XPS O1s spectrum of the active material used in Example 1. The O1s spectrum of the surface of the positive electrode active material covered with lithium phosphate was obtained by an XPS method. Al-Kα radiation was used as the XPS source.

A peak centered at 528 eV and a peak centered at 532 eV were observed. The peak at 528 eV is a peak assigned to M—O (Ni—O, Mn—O, Co—O) in the positive electrode active material. The peak at 532 eV is an overlap of a peak assigned to C—O in lithium carbonate as an impurity on the surface, and a peak assigned to P—O in lithium phosphate. A product obtained by heat-treating the active material that was not covered with the coating material in an oxygen atmosphere at 400° C. was analyzed, and the area of a peak that was detected near 532 eV was subtracted from the area of the peak near 532 eV assigned to the coated active material. In this manner, the influence of lithium carbonate was eliminated, and the area of the peak assigned to the covering was calculated.

Based on these peaks, the proportion of M—O and P—O in O1s was determined, and the coverage ratio was estimated. The coverage ratio of lithium phosphate on the active material used in Example 1 was estimated to be 18%.

Example 2

[Preparation of Positive Electrode Active Material Covered with Coating Material on the Surface]

In an argon glove box having an argon atmosphere with a dew point of less than or equal to −60° C., 14.2 mg of lithium hydroxide and 36.0 mg of triethyl phosphate were dissolved into an appropriate amount of super-dehydrated ethanol (manufactured by Wako Pure Chemical Industries, Ltd.) to give a coating material solution.

[Fabrication of Battery]

A battery was fabricated in the same manner as in Example 1, except that the amount of coating on the active material was changed.

[Measurement of Resistance]

The resistance of the battery was evaluated in the same manner as in Example 1.

Example 3

[Preparation of Positive Electrode Active Material Covered with Coating Material on the Surface]

In an argon glove box having an argon atmosphere with a dew point of less than or equal to −60° C., 5.95 g of ethoxylithium (manufactured by Kojundo Chemical Lab. Co., Ltd.) and 36.43 g of pentaethoxyniobium (manufactured by Kojundo Chemical Lab. Co., Ltd.) were dissolved into 500 mL of super-dehydrated ethanol (manufactured by Wako Pure Chemical Industries, Ltd.) to give a coating material solution.

The coating material was applied onto the positive electrode active material NCM with use of a tumbling fluidized bed granulating-coating machine (FD-MP-01E manufactured by Powrex Corporation). The amount of the positive electrode active material added, the stirring rotational speed, and the feed rate for the coating material solution were 1 kg, 400 rpm, and 6.59 g/min, respectively.

The powder after the treatment was placed into an alumina crucible and was taken out to an air atmosphere.

Next, the powder was heat-treated in the air atmosphere at 300° C. for 1 hour.

The powder after the heat treatment was reground in an agate mortar to give a positive electrode active material of Example 3 covered with the coating material on the surface. The coating material was lithium niobate (LiNbO₃).

[Fabrication of Battery]

A battery was fabricated in the same manner as in Example 1, except that the coating material for the active material was changed.

[Charge/Discharge Test]

The battery was tested in the same manner as the charge/discharge test in Example 1.

[Measurement of Resistance]

The resistance of the battery was evaluated in the same manner as in Example 1.

[Measurement of Coverage Ratio]

An O1s peak assigned to Nb—O in lithium niobate appears near 530 eV. Based on the value of that peak, the coverage ratio was determined in the same manner as in Example 1. The coverage ratios on the active materials used in Examples 2 and 3 were approximately 100%.

Example 4

[Preparation of First Solid Electrolyte]

In an argon atmosphere having a dew point of less than or equal to −60° C., LiCl, LiBr, CaBr₂, YCl₃ and GdCl₃ as ingredient powders were provided in a molar ratio of LiCl: LiBr:CaBr₂:YCl₃:GdCl₃=1.0:1.8:0.1:0.9:0.1. These powders were ground and mixed in a mortar. Subsequently, the resultant mixture of the ingredient powders was heat-treated in an argon atmosphere using an electric furnace at 500° C. for 3 hours. The material obtained was ground using a pestle and a mortar. Thus, a powder of a first solid electrolyte of Example 4 was obtained.

[Fabrication of Battery]

A battery was fabricated in the same manner as in Example 2, except that the solid electrolyte was changed.

[Measurement of Resistance]

The resistance was evaluated in the same manner as in Example 1.

Comparative Example 1

[Provision of Positive Electrode Active Material]

The NCM used as the positive electrode active material in Examples 1 to 4 was used as a positive electrode active material of Comparative Example 1 without being covered with any coating material on the surface.

[Charge/Discharge Test]

The battery was tested in the same manner as the charge/discharge test in Example 1.

[Measurement of Resistance]

The resistance of the battery was measured in the same manner as in Example 1.

[Discussion 1]

Table 1 describes the coating materials, the thicknesses of the coating materials, the mass ratios, the first solid electrolytes and the values of resistance of Examples 1 to 4 and Comparative Example 1. The mass ratio indicates the ratio of the mass of the coating material to the mass of the positive electrode active material.

In the batteries of Example 1 and Comparative Example 1, the same HSE was used as the first solid electrolyte contained in the positive electrode material. The results electrolyte and eliminated or reduced the formation of a resistance layer between the active material and the solid electrolyte.

Example 2 and Example 4 are the same as each other in the type of the coating material and differ in the composition of the first solid electrolyte. The results indicate that the resistance of the battery was successfully reduced regardless of the proportions of elements constituting the first solid electrolyte.

TABLE 1

| | Coating material | Coating material thickness [nm] | Mass ratio [mass %] | First solid electrolyte | Resistance [ohm] |
|---|---|---|---|---|---|
| COMP. EX. 1 | None | — | — | $Li_{2.8}Ca_{0.1}Y_{0.6}Gd_{0.4}Br_2Cl_4$ | 222 |
| EX. 1 | Lithium phosphate | 4 | 0.5 | $Li_{2.8}Ca_{0.1}Y_{0.6}Gd_{0.4}Br_2Cl_4$ | 140 |
| EX. 2 | Lithium phosphate | 9 | 1.1 | $Li_{2.8}Ca_{0.1}Y_{0.6}Gd_{0.4}Br_2Cl_4$ | 100 |
| EX. 3 | Lithium niobate | 6 | 1.5 | $Li_{2.8}Ca_{0.1}Y_{0.6}Gd_{0.4}Br_2Cl_4$ | 84 |
| EX. 4 | Lithium phosphate | 9 | 1.1 | $Li_{2.8}Ca_{0.1}Y_{0.9}Gd_{0.1}Br_2Cl_4$ | 41 | confirmed that even when the first solid electrolyte that was used was HSE, the resistance of the battery was reduced by coating of the positive electrode active material with the coating material. This result indicates that the resistance of the battery can be effectively reduced by coating the surface of the positive electrode active material with the coating material regardless of the variations of types of metals constituting the solid electrolyte.

In the batteries of Example 1 and Example 2, the same HSE was used as the first solid electrolyte contained in the positive electrode material. In the batteries of Example 1 and Example 2, the same lithium phosphate was used as the coating material for coating the positive electrode active material contained in the positive electrode material. The results confirmed that the reduction in the resistance of the battery was larger when the coating material had a higher mass ratio relative to the positive electrode active material. It is probable that the coating material having a higher mass ratio to the positive electrode active material attained an increased coverage ratio on the positive electrode active material and consequently reduced the area of direct contact between the positive electrode active material and the solid electrolyte. That is, the coating material probably eliminated or reduced the formation of a resistance layer between the active material and the solid electrolyte, and thereby reduced the resistance of the battery.

As indicated by the results of Example 3 and Comparative Example 1, the resistance of the battery was reduced also when lithium niobate was used as the coating material. An oxide containing lithium, in particular, a phosphate that is a glass-forming oxide, or lithium niobate that is an intermediate oxide tends to form a thin covering when used as the coating material. In this case, the material forms a highly amorphous film by heat treatment at a low temperature. Thus, it is probable that such a film did not inhibit the transfer of lithium between the active material and the solid Example 5

[Preparation of First Solid Electrolyte]

In an argon atmosphere having a dew point of less than or equal to $-60°$ C., LiCl, LiBr, $CaBr_2$, $YCl_3$ and $SmCl_3$ as ingredient powders were provided in a molar ratio of LiCl: $LiBr:CaBr_2:YCl_3:SmCl_3=1.0:1.8:0.1:0.8:0.2$. These powders were ground and mixed in a mortar. Subsequently, the resultant mixture of the ingredient powders was heat-treated in an argon atmosphere using an electric furnace at 500° C. for 3 hours. The material obtained was ground using a pestle and a mortar. Thus, a powder of a first solid electrolyte of Example 5 was obtained.

[Fabrication of Battery]

A battery was fabricated in the same manner as in Example 2, except that the first solid electrolyte was changed.

[Measurement of Resistance]

The resistance of the battery was measured in the same manner as in Example 1.

Comparative Example 2

[Fabrication of Battery]

A battery was fabricated in the same manner as in Example 5, except that the NCM used as the positive electrode active material in Examples 1 to 5 was not covered with any coating material on the surface.

[Charge/Discharge Test]

The battery was tested in the same manner as the charge/discharge test in Example 1.

[Measurement of Resistance]

The resistance of the battery was evaluated in the same manner as in Example 1.

[Discussion 2]

Table 2 describes the coating materials, the thicknesses of the coating materials, the mass ratios, the first solid electrolytes and the values of resistance of Example 5 and Comparative Example 2.

In the batteries of Example 5 and Comparative Example 2, the first solid electrolyte present in the positive electrode material contained Sm as a constituent element. The results indicate that the resistance of the battery was significantly reduced by coating of the active material with lithium phosphate. It can be thus said that the advantageous effects of the present disclosure are not limited to cases where the first solid electrolyte contains Y and Gd as constituent elements, and the present disclosure is also effective when the first solid electrolyte contains Y and a rare earth element other than Y.

TABLE 2

| | Coating material | Coating material thickness [nm] | Mass ratio [mass %] | First solid electrolyte | Resistance [ohm] |
|---|---|---|---|---|---|
| COMP. EX. 2 | None | — | — | $Li_{2.8}Ca_{0.1}Y_{0.8}Sm_{0.2}Br_2Cl_4$ | 1100 |
| EX. 5 | Lithium phosphate | 9 | 1.1 | $Li_{2.8}Ca_{0.1}Y_{0.8}Sm_{0.2}Br_2Cl_4$ | 500 |

The battery of the present disclosure may be used as, for example, an all-solid-state lithium secondary battery.

What is claimed is:

1. A positive electrode material comprising:
a positive electrode active material;
a first solid electrolyte; and
a coating material covering at least part of the surface of the positive electrode active material, wherein
the first solid electrolyte is represented by the following compositional formula (1):

$$Li_aM_bX_c \qquad \text{Formula (1)}$$

wherein
in the compositional formula (1),
a, b and c are each independently a positive real number,
M comprises calcium, yttrium, and at least one rare earth element selected from the group consisting of Ce, Pr, Nd, Pm, Eu, Gd, Tb, Dy, Ho, Er, Tm, Yb, and Lu, and
X comprises at least one selected from the group consisting of F, Cl, Br and I.

2. The positive electrode material according to claim 1, wherein
the coating material includes O.

3. The positive electrode material according to claim 1, wherein
the coating material includes Li.

4. The positive electrode material according to claim 1, wherein
the coating material comprises at least one selected from the group consisting of lithium phosphate and lithium niobate.

5. The positive electrode material according to claim 1, wherein
the mass ratio of the coating material to the positive electrode active material is greater than or equal to 0.5 mass % and less than or equal to 2.0 mass %.

6. The positive electrode material according to claim 1, wherein
the thickness of the coating material is greater than or equal to 2 nm and less than or equal to 20 nm.

7. The positive electrode material according to claim 1, wherein

X comprises at least one selected from the group consisting of F, Cl and Br.

8. The positive electrode material according to claim 1, wherein
X comprises at least two selected from the group consisting of F, Cl and Br.

9. The positive electrode material according to claim 1, wherein
X comprises Cl and Br.

10. The positive electrode material according to claim 1, wherein
the positive electrode active material comprises a lithium-containing transition metal oxide.

11. A battery comprising:
a positive electrode comprising the positive electrode material according to claim 1;
a negative electrode; and
an electrolyte layer disposed between the positive electrode and the negative electrode.

12. The battery according to claim 11, wherein
the electrolyte layer comprises a sulfide solid electrolyte.

13. The positive electrode material according to claim 1, wherein
X comprises F.

14. The positive electrode material according to claim 1, wherein
X comprises F and at least one selected from the group consisting of Cl, Br and I.

15. The positive electrode material according to claim 1, wherein the first solid electrolyte is represented by Composition formula (2) below, $$Li_{6-2a-3d}Ca_a(Y_{1-b}Gd_b)_dBr_{6-c}Cl_c \qquad \text{Formula (2)}$$

where
Composition formula (2) above satisfies
$0<a$,
$0<b<1$,
$0<c<6$, and
$0<d<1.5$.

16. The positive electrode material according to claim 15, wherein Composition formula (2) above satisfies $0.01 \leq a \leq 0.3$.

17. The positive electrode material according to claim 16, wherein Composition formula (2) above satisfies $a \leq 0.2$.

18. The positive electrode material according to claim 15, wherein Composition formula (2) above satisfies $0.1 \leq b \leq 0.9$.

19. The positive electrode material according to claim 15, wherein Composition formula (2) above satisfies $0.8 \leq b < 1$.

20. The positive electrode material according to claim 15, wherein Composition formula (2) above satisfies $1.0 \leq c \leq 1.2$.

\* \* \* \* \*